Patented Jan. 2, 1934

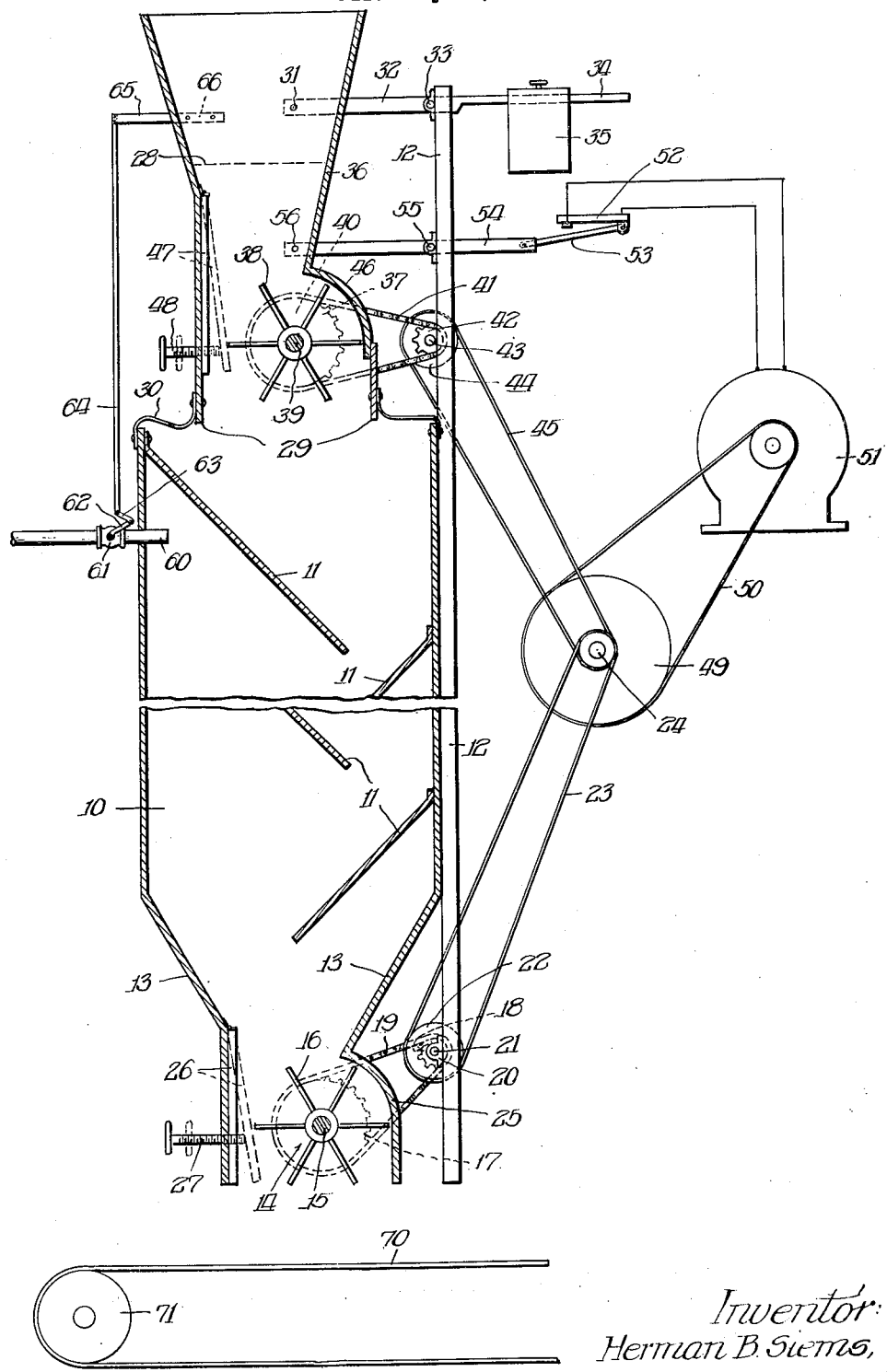

1,941,499

UNITED STATES PATENT OFFICE 1,941,499

CONTINUOUS AUTOMATICALLY CONTROLLED ABSORPTION SYSTEM

Herman B. Siems, Chicago, Ill., assignor to Swift & Company, Chicago, Ill., a corporation of Illinois Application May 29, 1930. Serial No. 456,904

13 Claims. (Cl. 71—1)

This invention relates to a novel and improved apparatus, adapted for use for the purpose of bringing together by a continuous operation, solid materials and gases or highly volatile liquids in predetermined and controlled associated relationship whereby the device may be employed in processes such as the absorption of gases or highly volatile liquids by solid materials.

The invention is herein illustrated as embodied in a device which is particularly adaptable for use in the absorption of anhydrous ammonia by superphosphate, treble superphosphate or fertilizer mixtures containing superphosphate, treble superphosphate, or both.

An object of the present invention is to provide a device which is simple and efficient in its operation and is capable of continuous operation, whereby processes such as the absorption process, referred to, may be conducted continuously over a period of time.

A further object of the invention is to provide a device which is peculiarly adapted for use with processes employing a gas and includes in its construction, features which provide for the handling of the gas without leakage and with maximum good results.

Another object of the invention is to provide means whereby the feeding of the materials to be brought into associated relationship to the device, are controlled in a manner to assure at all times, that the materials are present in the proper quantity and proportion during the continued operation thereof.

A further object is to provide a device in which sealing against leakage of gases is accomplished by the solid material fed thereto.

A further object is to provide a movable feeding mechanism the operation of which, is automatic, the feeding thereof being effected only when there is a sufficient quantity of material available for feeding purposes to assure the proper sealing against the leakage of gas.

A further object of this invention is to provide means for controlling the admission of the gas or other substance to be absorbed, contingent upon the same circumstances as those employed for controlling the movable feeding mechanism referred to in the above stated object.

It is a further object to provide inlet and outlet means for the mixing chamber, which are designed in construction and operation, for the prevention of the leakage of gases from the chamber.

It is a still further object, to provide a positive discharging mechanism which functions to discharge the contents of the chamber, only when the mixing operation is in process.

These and other objects not specifically enumerated are contemplated for the present invention, as will hereinafter more fully appear to those skilled in the art as the following description proceeds. The present disclosure is given merely by way of example, and is not intended to limit the invention in any respect, as the scope of the invention may be determined from the appended claims and from an understanding of the present disclosure and an appreciation of the advantages which the present invention produces therein.

The following description may be more readily understood by referring to the accompanying drawing, in which—

The figure is an elevational view in cross section, disclosing a device constructed in accordance with the present invention.

By referring to the drawing, it will be noted that this invention is illustrated as embodied in a device comprising a chamber 10, of any suitable formation and size, depending upon the use to which it is put, having a plurality of baffles 11, positioned therein, in the present instance, shown as stationary, extending from opposite side walls. The function of the baffles is merely that of interrupting the path of the material through the chamber whereby to effect a more intimate contact between the fluids and materials treated. It is in accord with the present invention to provide any suitable baffles and if desired, baffles which are mounted and connected for movement so as to produce a more violent agitation of the material may be used.

The chamber 10, is formed of any suitable material, so as to constitute an enclosure, and is preferably mounted on a suitable frame, such as the upright frame piece 12. The bottom of the mixing chamber may be formed with converging walls 13, suitable for directing the contents of the chamber downwardly onto the discharging mechanism 14. This latter mechanism comprises a shaft 15, having a plurality of radially disposed blades 16, which act to close the opening provided at the discharge, but upon rotation, serve to discharge the material pocketed between the blades.

The shaft 15 is provided with a sprocket 17, which is driven from the sprocket 18, by means of the chain 19. The sprocket 18, is mounted in suitable bearings 20, on the frame piece 12, and is fixed to turn with a shaft 21, on which is also mounted the sprocket 22. This latter sprocket is in mesh with the chain 23, which is driven from a power shaft 24, all of which operates to effect discharge only when the hopper contains a predetermined load, as hereinafter more specifically referred to.

On one side of the discharge mechanism, a wall 25, is provided with a rounded portion adapted for close association with the outer edges of the blade 16, whereby to permit rotation of the discharge device and yet, maintain the opening substantially closed. At the opposite side of the discharge mechanism a wall plate 26 is provided, adapted to be moved into close association with the edge of the blades by means of the adjusting screw 27.

The upper end of the mixing chamber is closed by a hopper and feeding device designated as a unitary assembly by the numeral 28 and hereinafter more specifically described.

This assembly 28, has its lower ends 29, terminate at substantially the plane of the upper end of the chamber, and of a size to avoid interference with the upper end of the chamber walls. The space between the upper end of the chamber walls and the lower end of the assembly is closed by means of flexible material 30, which may be of rubber or like material and which effectively seals the two edges. This material will permit movement of the assembly and yet prevent the escape of gases or materials from the chamber. The assembly 28, referred to, is mounted for movement by means of pivotal mounting 31, on a pair of arms 32, which are in turn pivoted on a shaft 33, mounted in bearings, carried on the frame piece 12.

Arms 32 extend on the opposite side of the bearings as at 34, and are provided with a movable counterweight 35, capable of adjustment so as to balance the assembly 28, and a charge of material of predetermined weight therein. The assembly comprises primarily, a hopper 36, having an open top adapted to receive material and a feeding or charging device 37, of the rotary type, similar in construction to the discharge mechanism, previously described. The feeding or charging device has blades 38, mounted on the shaft 39, which is driven by means of a sprocket 40, chain 41, sprocket 42, shaft 43, sprocket 44 and chain 45, from the power shaft 24, previously referred to. This device, like the discharge device, also includes a curved wall 46, and an adjustable plate 47, regulated by the screw mechanism 48.

The power shaft 24, is driven by a sprocket 49, which is in turn driven through the chain 50, by the electric motor 51. The motor is connected for operation by an electric switch 52, which has a contact arm 53, adapted for movement to make and break the circuit and has its outer end connected to a lever 54. The lever is pivoted to the frame 12, as at 55, with its opposite end pivotally connected as at 56, to move with the assembly 28. From this construction it will be obvious that the downward movement of the assembly as effected by a proper charge of material in the hopper 36, will cause the switch lever 53, to make contact and to thereby start the motor 51 in operation.

By means of the gearing connections described, it will further appear that the feeding or charging device and the discharging device will simultaneously commence operations at this time.

The mixing chamber, at a suitable location, is provided with an inlet pipe 60, in the present instance; near the top thereof, having a control valve 61, controlled by a lever 62. This lever is connected by means of links 63 and 64, to an arm 65, which is secured to the assembly 28, as at 66, and thereby adapted to travel with the assembly.

These parts are so regulated and designed in connection with the operation of the motor switch above described, that the admission of gas or highly volatile material through the pipe 60, will be started simultaneously with the starting of the charging and discharging devices, and likewise, will be shut off at such time as the contact switch is broken and the charging and discharging mechanism stop.

Located beneath the discharging mechanism is a conveyor 70, carried on a suitable pulley 71, which conveyor in operation, is constructed and arranged to receive the materials discharged from the mixing chamber and to carry such material to any point desired.

An important feature of this invention is that the material which is fed into the upper hopper, serves as a seal to prevent the escape of gas from the mixing chamber. The charging device is effective to substantially close the inlet opening but is not sufficient to constitute an absolute seal against the passage of gases. However, it is found in practice, that a seal is provided when a predetermined amount of material is maintained in the hopper. In operation therefore, the counter weight will be adjusted to accommodate that quantity of material which is required to produce an effective seal.

It will therefore appear that in operation, material may be fed to the hopper, preferably continuously by some suitable means, such as a conveyor, not shown, and at a rate of speed and quantity suitable to maintain the hopper filled to that degree which will assure an effective seal. This of course, will depend upon the speed at which the charging device operates, which is continuously removing the material from the hopper. However, if it happens that the quantity of material in the hopper, for one reason or another, becomes diminished to that extent which will permit an escapement of the gases from the mixing chamber, the hopper, under the action of the counterweight will rise and shut off the switch and the motor and thereby stop the charging device, and also shut off the supply of gas or volatile liquid to the mixing chamber.

This of course, is desirable, because it prevents the mechanism from continuing operation under those conditions which are not conducive to the best and most efficient results.

Although the present invention is illustrated in a device which is particularly adaptable for use in an absorption process of fertilizer mixtures of superphosphate and the like, with anhydrous ammonia, it is obvious that it has utility in other applications.

I claim:

1. A mixing device of the character described comprising a chamber, means for charging said chamber with solid material and means for discharging the solid material from said chamber both of said means being constructed to provide seals by predetermined accumulations of material associated therewith whereby to prevent leakage of gas from said chamber, and means for driving said charging and discharging means in synchronism and means for automatically stopping said means when said accumulations of material become diminished below said predetermined amount.

2. A mixing device of the character described comprising a chamber, means for charging said chamber with solid material and means for discharging the solid material from said chamber both of said means being constructed to provide seals by predetermined accumulations of material associated therewith whereby to prevent leakage of gas from said chamber, and means for driving said charging and discharging means in synchronism and means for automatically starting said means upon accumulating a charge of material equal to or greater than said predetermined amount.

3. A mixing device of the character described comprising a chamber, means for charging said chamber with solid material and means for discharging the solid material from said chamber, both of said means being constructed to provide seals by predetermined accumulations of material associated therewith whereby to prevent leakage of gas from said chamber, and independent means for introducing gas or highly volatile liquids to said chamber for reaction with said solid material, and means for automatically starting both of said first named means and admitting gas or volatile liquid upon accumulating a charge of material equal to or greater than said predetermined amount.

4. A mixing device of the character described, comprising a chamber, means for charging said chamber with solid material and means for discharging the solid material from said chamber, both of said means being constructed to provide seals by predetermined accumulations of material associated therewith whereby to prevent leakage of gas from said chamber, and means for introducing gas or highly volatile liquids to said chamber, and means for automatically starting both of said first named means and admitting gas or volatile liquid upon accumulating a charge of material equal to or greater than said predetermined amount, and for stopping said first named means and the admission of gas or volatile liquid upon depletion of the accumulation below said predetermined amount.

5. In combination with a mixing chamber, a hopper and a charging device for said chamber associated with said hopper, said hopper and charging device being supported on a pivotally mounted beam and counter balanced with a weight, means for driving said charging device, and means in cooperative association with said beam operative by the movement of said beam under the influence of changing weights in said hopper for controlling said means for driving said charging device.

6. In combination with a mixing chamber, a hopper, and a charging device for said chamber associated with said hopper, and a discharging device for said chamber, said hopper being bodily movable under the influence of a predetermined quantity of material in said hopper and means for driving said charging and discharging devices, controlled by means responsive to the movement of said hopper.

7. In combination with a mixing chamber, a hopper, and a charging device for said chamber associated with said hopper, and a discharging device for said chamber, said hopper being bodily movable under the influence of a quantity of material in said hopper sufficient to prevent escape of gas from said chamber, and means for introducing gas or highly volatile liquid, into said chamber, and means for driving said charging and discharging devices and for controlling the admission of gas or volatile liquid, controlled by means responsive to the movements of said hopper.

8. In combination with a mixing chamber, a hopper, and a charging device for said chamber associated with said hopper, and a discharging device for said chamber, said hopper being bodily movable under the influence of a quantity of material in said hopper sufficient to prevent escape of gas from said chamber, and means for introducing gas or highly volatile liquid into said chamber and means for driving said charging and discharging devices and for controlling the admission of gas or volatile liquid controlled by means responsive to the movements of said hopper, said charging and discharging devices being arranged to feed material at substantially the same rate.

9. In combination with a mixing chamber, a hopper and a charging device for said chamber associated with said hopper and inlet means leading into said chamber for introducing a gas or volatile liquid, said hopper being movable under the influence of a predetermined quantity of material in said hopper and means for driving said charging device controlled by means responsive to the movement of said hopper and means for controlling the supply of gas or volatile liquid into said chamber responsive to movement of said hopper and charging device.

10. In combination with a mixing chamber, a hopper, a charging device for said chamber associated with said hopper, said hopper being bodily movable under the influence of a predetermined quantity of material in said hopper, means for driving said charging device, and means for starting and stopping said last named means responsive to the movement of said hopper.

11. In combination with a mixing chamber, a hopper, a charging device for said chamber associated with said hopper, said hopper being mounted for movement under the influence of gravity upon receiving a predetermined quantity of material therein and for opposite movement when containing an amount of material less than said predetermined quantity, means for driving said charging device, and means for starting and stopping said last named means responsive to the movement of said hopper.

12. In combination with a mixing chamber, a hopper, charging and discharging devices for said chamber, said hopper being mounted for movement under the influence of gravity upon receiving a predetermined quantity of material, and movement in the opposite direction when containing material in amount less than said predetermined quantity, means for driving said charging and discharging devices and means for starting and stopping said last named means responsive to the movement of said hopper.

13. In combination with a mixing chamber, a hopper, charging and discharging devices for said chamber, and means for introducing a processing fluid into said chamber, said hopper being mounted for movement under the influence of gravity upon receiving a predetermined quantity of material and for movement in the opposite direction when containing material in amount less than said predetermined quantity, means for driving said charging and discharging devices, and means for starting and stopping said last named means and for controlling the introduction into said chamber of said processing fluid responsive to the movement of said hopper.

HERMAN B. SIEMS.